United States Patent [19]
Kiser

[11] Patent Number: 5,791,742
[45] Date of Patent: Aug. 11, 1998

[54] THREE WHEELED STROLLER WHEEL

[76] Inventor: Randolph L. Kiser, 789 Johnston Dr., Sidney, Ohio 45365

[21] Appl. No.: 736,740

[22] Filed: Oct. 25, 1996

[51] Int. Cl.[6] .................................................. B60B 1/00
[52] U.S. Cl. ................................... 301/64.7; 152/393
[58] Field of Search .......................... 301/64.7, 64.1, 301/105.1, 110.5, 95, 96, 97, 104; 152/323, 393, 394

[56] References Cited

U.S. PATENT DOCUMENTS

| | | | |
|---|---|---|---|
| 1,865,432 | 7/1932 | Bossert | 152/394 X |
| 3,452,798 | 7/1969 | Ravreby | 152/323 |
| 3,656,531 | 4/1972 | Ross et al. | 301/64.7 X |
| 4,280,736 | 7/1981 | Raudman | 301/64.7 X |
| 4,561,481 | 12/1985 | Kawauchi et al. | 301/97 X |
| 5,117,885 | 6/1992 | Crawford | 152/323 |
| 5,184,874 | 2/1993 | Olson et al. | 301/64.7 |
| 5,211,213 | 5/1993 | Hicks | 301/64.7 X |

FOREIGN PATENT DOCUMENTS

| | | | |
|---|---|---|---|
| 3536308 | 4/1987 | Germany | 301/64.7 |

*Primary Examiner*—Russell D. Stormer

[57] ABSTRACT

The present invention relates to a wheel including a hollow central hub having an interior periphery and an outer periphery with a plurality of equally spaced apertures through the outer periphery. The wheel includes a rim having an inner periphery and an outer periphery. A pair of upwardly extending side walls extend about the outer periphery of the rim and create a channel about the rim. A plurality of apertures are formed within the rim. The apertures are equally spaced about the rim. Each of the spokes connects with the rim at one of the apertures and at the hub at one of the apertures.

3 Claims, 3 Drawing Sheets

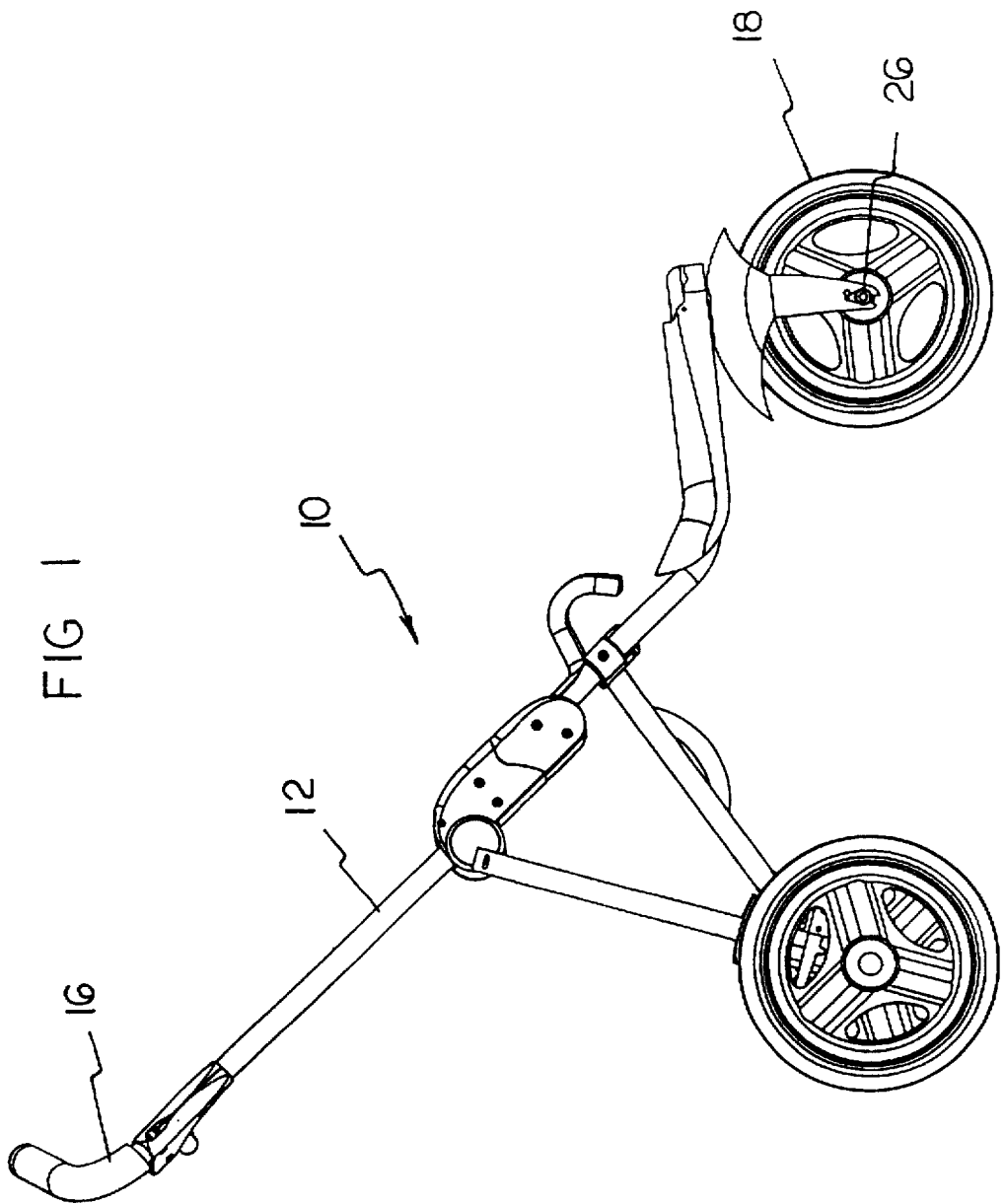

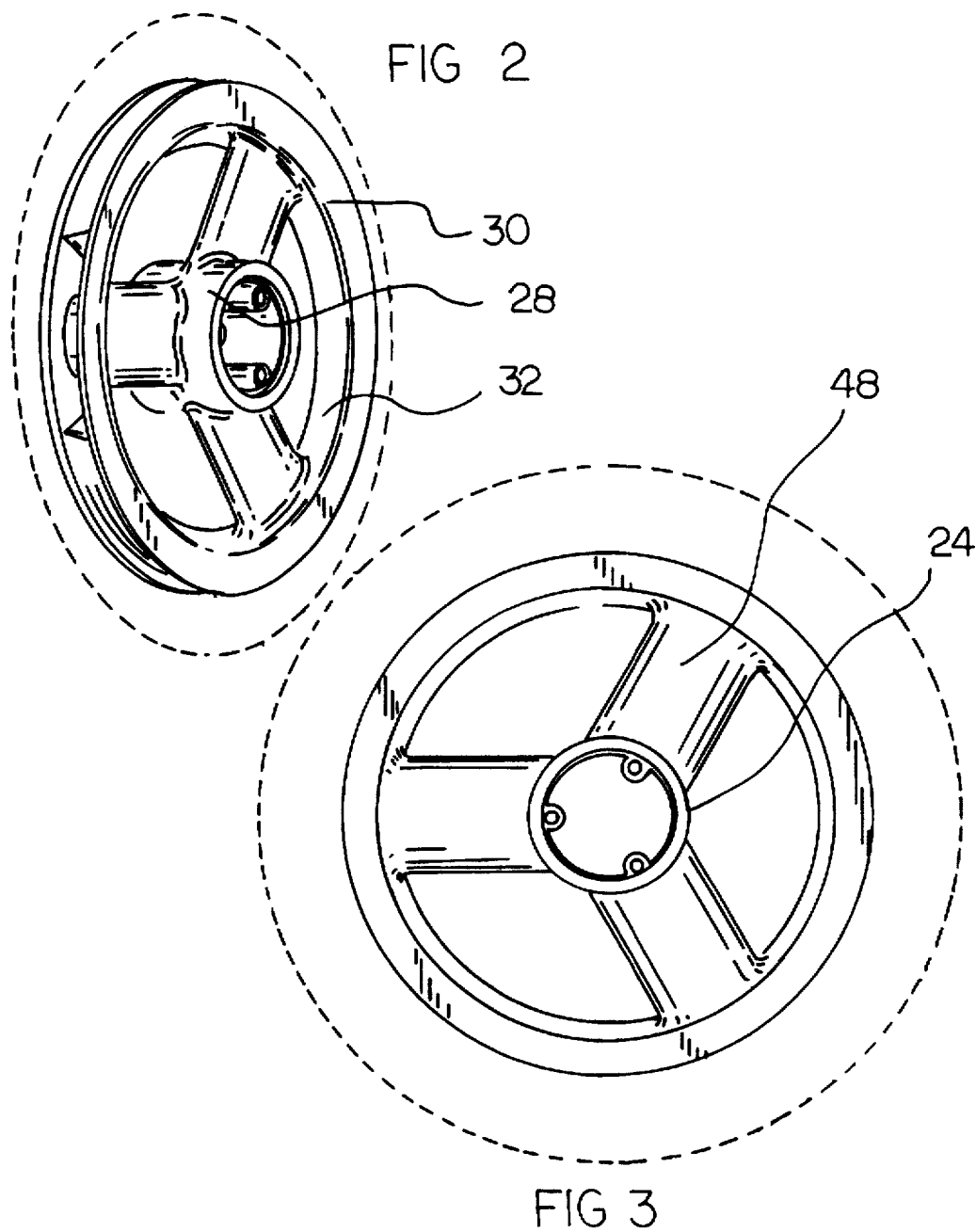

THREE WHEELED STROLLER WHEEL

BACKGROUND OF THE INVENTION

1. Field of the Invention

The present invention relates to a three wheeled stroller wheel and, more particularly, to such a wheel for a stroller or vehicle wherein the wheel includes an interior central hub, an exterior rim with hollow spokes therebetween.

2. Description of the Prior Art

The use of strollers for transporting children is known in the prior art. Furthermore, the use of strollers with three wheels is also known in the prior art. Wheels for strollers and like vehicles are generally conventional in their designs. Such wheels are of normally acceptable rigidity for safety. None of the known wheels, however, provide the safety, esthetic appeal and economy present in the design of the present invention.

The wheel of the present invention is preferably manufactured of molded plastic or, in the alternative, cast metal. The wheel is designed to provide spokes radiating from a central hub to support the rim. The spokes are preferably essentially as thick as the width of the rim itself. The spokes are molded or cast such that the spokes are hollow.

Essentially all stroller wheels and wheels for other similar applications are molded with aesthetic detail on one side only or with flat spokes. The present method allows for spokes with a substantial appearance, that is, spokes which are much thicker than known spokes.

The literature discloses various stroller arrangements. Note U.S. Patent Des. 326,838 to Julien; U.S. Pat. No. 361,320 to Wise; U.S. Patent Des. 276,513 to Honsa; U.S. Patent Des. 298,540 to Grawey et al.; and U.S. Patent Des. 309,254 to Guile, each of which disclose various wheel designs.

None of these wheels, however, provides the safety, lightness, economy and esthetic appeal of the present design.

The present invention achieves its intended purposes, objects and advantages over the prior art through a new, useful and unobvious combination of components elements, through the use of a minimum number of functioning parts, at a reasonable cost to manufacture, and through the utilization of only readily available and conventional materials.

Therefore, the present invention relates to a new and improved wheel including a hollow central hub having an interior periphery and an outer periphery with a plurality of equally spaced apertures through the outer periphery. The wheel includes a rim having an inner periphery and an outer periphery. A pair of upwardly extending side walls extend about the outer periphery of the rim and create a channel about the rim. A plurality of apertures are formed within the rim. The apertures are equally spaced about the rim. Each of the spokes connects with the rim at one of the apertures and at the hub at one of the apertures.

Therefore, it is an object of this invention to provide a wheel which overcomes the inadequacies of the prior art devices and which constitutes an improvement which is a significant contribution to the advancement of the art.

Another object of the invention is to enable a wheel for a stroller to offer maximum safety, lightness and economy.

It is another object of the present invention to provide a wheel for a stroller which may be easily and efficiently manufactured and marketed.

It is a further object of the present invention to provide a three wheeled stroller with a wheel construction which is of a durable and reliable construction while maximizing its esthetic appeal.

The foregoing has outlined some of the more pertinent objects of the present invention. These objects should be construed to be merely illustrative of some of the more prominent features and applications of the intended invention. Many other beneficial results could be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention as defined by the claims taken in conjunction with the accompanying drawings.

SUMMARY OF THE INVENTION

The invention is defined by the appended claims with the specific embodiment shown on the attached drawings. For the purposes of summarizing the invention, the invention essentially comprises a three wheeled stroller wheel.

This three wheeled stroller wheel includes a hollow central hub having an outer periphery and an interior periphery constituting a bearing assembly. Three hollow spokes extend outwardly from the outer periphery of the central hub. Each spoke is of a linear, cylindrical configuration and is equally spaced from one another. The wheel includes a rim having an inner periphery and an outer periphery. A pair of upwardly extending side walls extend about the outer periphery of the rim and create a channel about the rim. Three apertures are formed within the rim. The apertures are equally spaced about the rim. Each of the spokes connects with the rim at one of the apertures. An axial width of the channel is substantially twice an axial width of the apertures. The axial width of the apertures are about twenty-five percent of a circumferential width thereof. A pair of integrally formed cone-shaped spikes with radially offset axes are adjacent to each aperture. The spikes are adapted to secure the rim to a corresponding tire, wherein the hub, spokes and rim all are integrally molded from a plastic material.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. Its should be appreciated by those skilled in the art that the conception and the disclosed specific embodiment may be readily utilized as a basis for modifying or designing other structures for carrying out the same purposes of the present invention. It should also be realized by those skilled in the art that such equivalent methods and structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which;

FIG. 1 is a side view of the wheel illustrated with respect to the stroller.

FIG. 2 is a perspective view of the wheel of the present invention.

FIG. 3 is a front elevation view of the wheel as illustrated in FIG. 2.

The same reference numerals refer to the same parts through the various Figures.

DESCRIPTION OF THE PREFERRED EMBODIMENT

Figures 4, 5:
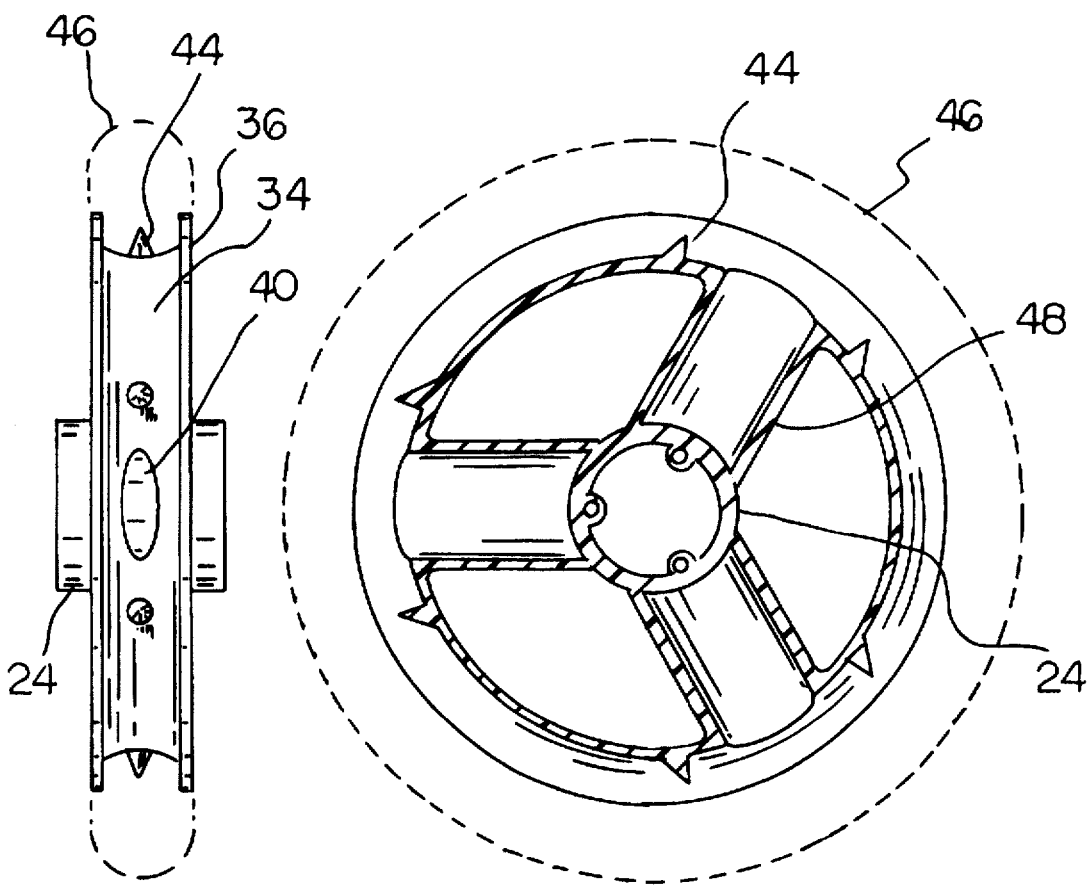
FIG. 4 is a side elevation view of the wheel of the present invention.
FIG. 5 is a front elevation view of the wheel as illustrated in FIG. 4.

The present invention relates to a three wheeled stroller wheel. In its broadest context, the wheel of the present invention includes an interior central hub, an exterior rim with hollow spokes therebetween. The various components of the present invention, and the manner in which they interrelate, will be described in greater detail hereinafter.

The structure of the stroller 10, on which the wheel of the present invention is utilized, includes a frame. The frame has a first and second side frame, each of essentially identical construction. The stroller is of the type more fully described in U.S. patent application Ser. No. 08/736,743 filed concurrently herewith. The subject matter of such application is incorporated herein by reference. Each side frame includes an upper extent, a lower extent and an intermediate portion therebetween. The upper extent of each side frame takes the form of an curved handle. These handles, as with other components of the frame, can be covered in a resilient foam padding. Each side frame also includes a curved seating frame element adjacent its lower extent. Furthermore, each side frame incorporates a pivot assembly between its upper and lower extents. More specifically, the first side frame includes a first pivot assembly and the second side frame includes a second pivot assembly. Each of the pivot assemblies has a first, engaged, orientation which prevents the pivotal movement between the upper and lower extents of the side frame. Alternatively, each pivot assembly has a second, disengaged, orientation which permits the pivotal movement between the upper and lower extents of the side frame. These pivot assemblies will be described in greater detail hereinafter. In order to facilitate the complete collapsing of the stroller, the two side frames are pivotally interconnected at their lower extents. The manner in which the entire frame structure collapses will be described in greater detail hereinafter.

A first and second side rearward frame constitute two more elements of the overall frame structure. The first side rearward frame has one of its ends interconnected with the intermediate portion of the first side frame. More specifically, this end is secured to the pivot assembly of the first side. This first side rearward frame also has a distal end. In a similar fashion, the second side rearward frame has one of its ends interconnected with the intermediate portion of the second side frame. More specifically, this end is secured to the pivot assembly of the second side. This second side rearward frame also has a distal end.

Lateral stability is provided to the frame structure in three ways: a pair of cross braces; an upper pair of lateral braces; and a lower pair of lateral braces. The upper pair of lateral braces will next be described. The upper pair of lateral braces includes a first upper lateral brace pivotally secured to the upper extent of the first side frame, and a second upper lateral brace pivotally secured to the upper extent of the second side frame. These two lateral braces are pivotally interconnected by way of an upper lateral lock assembly. The details regarding this lateral lock assembly will be described in greater detail hereinafter.

The front wheel assembly of the stroller 10 is interconnected to the lower extents of both the first and second side frames. In the preferred embodiment, means are included to enable the front wheel to swivel about a vertical axis. Such an arrangement enables the stroller to be easily maneuvered. Additionally, mechanisms are included to enable, at the user's discretion, the front wheel to be locked in a desired orientation relative to the vertical axis. Such locking mechanism is more fully described in copending application Ser. No. 08/736,746 filed concurrently herewith. The subject matter of such application is incorporated herein by reference.

The stroller 10 thus includes a frame 12. A seat is provided at an intermediate extent of the frame for a seated child to be conveyed. Handles 16 are at the upper extent of the frame for being held by the person pushing the stroller. Wheels 18 are located at the lower extent of the frame to allow for smooth rolling movement of the stroller. Three wheels are provided in the preferred embodiment of the invention. Each of the wheels is of essentially a common construction.

One major component of each wheel is a hollow central hub 24. The hub has an interior bearing surface located on an axle 26 of the frame for rotation during operation and use. In addition, each hub has an outer periphery 28.

Next provided as a component of the wheel is a rim 30. The rim has an inner periphery 32 and an outer periphery 34. A pair of upwardly extending side walls 36 extend about the outer periphery of the rim. These create a channel about the rim for the receipt of a tire.

The channel has an exterior axial width which is substantially twice an axial width of the spokes as will be later explained in greater detail. In the preferred embodiment three apertures 40 are formed in the rim for communicating with the spokes. The apertures are equally spaced around the rim preferably at about 120 degrees. Each of the spokes connects with the rim 30 at one of the apertures.

A plurality of integrally formed generally cone-shaped spikes 44 are located adjacent to each of the apertures. The spikes are adapted to imbed into and thus secure the rim to a corresponding tire 46. The tires have an exterior tread pattern around its exterior surface. The spikes are preferably formed in pairs circumferentially disposed between the aperture. They preferably include cone axes offset in opposite directions from the radius of the wheels to promote locking of the tires when the stroller is pushed forwardly and rearwardly.

The next components of the tire are a plurality of hollow spokes 48. In the preferred embodiment, three such identically configured spokes are provided. The spokes extend radially outwardly from apertures 40 formed in the periphery of the central hub. The spokes are preferably equally spaced from one another. Each has an axial width essentially equal to the width of the apertures in the rim and, consequently extend to essentially the entire width of the rim. The exterior axial width of the spoke is preferably less than 50 percent of the axial width of both the central hub and the rim.

In the preferred embodiment, the hub, spokes and rim are all integrally molded together from a common plastic material, or in an alternate embodiment of the invention from a common metal material.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A three wheeled stroller with wheels, each wheel comprising in combination:

a hollow central hub having an inside diameter, an outer periphery and an interior periphery constituting a bearing assembly;

three hollow spokes extending outwardly from the outer periphery of the central hub, each spoke being of a linear, cylindrical configuration and being equally spaced from one another; and a rim having an inner periphery and an outer periphery, a pair of upwardly extending side walls extending about the outer periphery of the rim and creating a channel about the rim, three apertures formed within the rim, the apertures being equally spaced about the rim, each of the spokes connecting with the rim at one of the apertures, an axial width of the channel being substantially twice an axial width of the apertures, each spoke having a thickness which is substantially equal to the inside diameter of the central hub, a pair of integrally formed cone-shaped spikes with radially offset axes adjacent to each of the apertures, the spikes adapted to secure the rim to a corresponding tire, wherein the hub, spokes and rim all are integrally molded from a plastic material.

2. A wheel comprising:

a hollow central hub having an inside diameter an interior periphery and an outer periphery with a plurality of equally spaced apertures through the outer periphery;

three hollow spokes extending outwardly from the outer periphery of the central hub, each spoke being equally spaced from one another and being of a linear cylindrical configuration;

a rim having an inner periphery and an outer periphery, a pair of upwardly extending side walls extending about the outer periphery of the rim and creating a channel about the rim, a plurality of apertures formed within the rim, the apertures being equally spaced about the rim; and each of the spokes connecting with the rim at one of the apertures and at the hub at one of the apertures each spoke having a thickness which is substantially equal to the inside diameter of the central hub;

a pair of integrally formed spikes adjacent to each of the apertures, wherein each of the spikes has a radially offset axis.

3. The wheel as set forth in claim 2 wherein the hub, spokes and rim all are integrally molded from a plastic material.

* * * * *